(12) United States Patent
Lin

(10) Patent No.: US 6,305,028 B1
(45) Date of Patent: Oct. 23, 2001

(54) LIGHT REFLECTIVE PROTECTIVE HEADWEAR

(76) Inventor: Chang-San Lin, 2nd Floor, 749 Ming-tsu East Road, Suite 2, Taipei (TW)

( * ) Notice: Subject to any disclaimer, the term of this patent is extended or adjusted under 35 U.S.C. 154(b) by 0 days.

(21) Appl. No.: 09/251,959

(22) Filed: Feb. 17, 1999

(51) Int. Cl.$^7$ .......................................... A42B 3/06
(52) U.S. Cl. .............................. 2/410; 2/200.1; 2/209.13; 40/582
(58) Field of Search ................................ 2/410, 411, 412, 2/425, 200.1, 171, 209.13; 40/582

(56) References Cited

U.S. PATENT DOCUMENTS

| | | | |
|---|---|---|---|
| 3,766,565 | * 10/1973 | Cozzens | ................................... 2/200 |
| 3,770,483 | * 11/1973 | Komine . | |
| 3,885,246 | * 5/1975 | Tung . | |
| 4,008,949 | * 2/1977 | Luna . | |
| 4,100,625 | * 7/1978 | Tung | ........................................ 2/410 |
| 4,993,082 | * 2/1991 | Gentes et al. | ............................ 2/410 |
| 5,106,126 | * 4/1992 | Longobardi et al. | .................. 40/582 |
| 5,407,711 | * 4/1995 | Lovison et al. | ........................ 428/13 |
| 5,716,682 | * 2/1998 | Lovison et al. | ........................ 428/30 |
| 5,829,063 | * 11/1998 | Cheng | ................................ 2/209.13 |
| 6,038,704 | * 3/2000 | Crescentini | ............................. 2/410 |

\* cited by examiner

*Primary Examiner*—Michael A. Neas
(74) *Attorney, Agent, or Firm*—Fish & Richardson P.C.

(57) ABSTRACT

Protective headwear (e.g., helmet) is provided with patterned reflective surfaces that are highly reflective and resist rough handling. The reflective surface is produced by sealing a reflective sheet between a base and a cover layer that includes a pattern, to protect the reflective sheet from the environment. The protective headwear can reflect light in different colors. A method for cost-effectively producing reflective objects by injection molding is also provided.

15 Claims, 6 Drawing Sheets

LIGHT REFLECTIVE PROTECTIVE HEADWEAR

FIELD OF THE INVENTION

The invention relates to protective headwear, for example, a helmet that reflects light.

BACKGROUND OF THE INVENTION

One conventional approach for producing a light-reflective object includes attaching a number of reflective decals formed on a paper or plastic base to the surface of these objects, for example with an adhesive. In other approaches, a reflective material is sprayed directly onto the object, for example through a patterned mask, or a desired pattern of the reflective material is formed and is then sewn on a fabric. The object is then covered with the fabrics. The reflective material can also be sewn directly onto the object.

The conventional approaches described above suffer from a number of disadvantages. One disadvantage is that the reflectivity of these surfaces can degrade prematurely since the reflective material is, in most cases, directly exposed to the environment, i.e., the ambient air, moisture, sunlight and dust. For example, if the reflective surfaces are formed of thin metal coatings, for example, silver or aluminum, such coatings tend to oxidize in air causing their reflectivity characteristics to degrade rapidly. An unprotected reflective surface can also be easily damaged and/or scratched upon contact with other objects, for example, when used in harsh environments, such as at a construction site. Reflective surfaces that are produced by spraying a reflective paint on the object, tend to have poor reflectivity and produce less vibrant colors.

Using an adhesive to attach reflecting decals on objects requires a large number of processing steps, such as printing, cutting and attaching. Thus, this approach is not cost-effective. Cutting and sewing is also required when the decals are attached to fabrics.

SUMMARY OF THE INVENTION

The invention relates to protective headwear having a light-reflecting surface with high reflectivity. In one aspect of the invention, the protective headwear includes a shell member having a molded base; a cover sheet, covering the molded base, with a pattern defined by areas that are transparent to the optical radiation passing through the cover sheet and other areas that are opaque to the optical radiation and a reflective sheet sealed between the molded base and the cover sheet from the environment.

Embodiments of this aspect of the invention may include one or more of the following features. The patterned structure can be formed directly on the cover sheet. Alternatively, the protective headwear may further include a separate patterned sheet that is arranged between the cover sheet and the reflective sheet. The cover sheet is preferably made of a plastic that is impervious to air and moisture. The reflective sheet can be a metal foil or a plastic sheet that is coated with a reflective metal. The reflective sheet can also have the form of a reflective dielectric stack. The reflective sheet and the cover sheet can have spectrally selective optical characteristics. The base can be in the form of a shaped object, for example a helmet made by injection molding from polyurethane. The pattern can be an ornamental design, a logo and the like.

In another aspect, the invention provides a method of manufacturing protective headwear, for example a helmet, by placing a patterned cover sheet in first molding die to shape the cover sheet in the shape of the die. A reflective sheet is placed on the shaped patterned cover sheet and molding material is injected between the reflective sheet and a second molding die to form the shaped object. The reflective sheet is thereby sealed between the cover sheet and the molded shaped object.

In another aspect of the invention, a method of manufacturing light-reflecting objects includes first forming a shaped object and then covering the shaped object, in succession, with a reflective sheet and a patterned cover sheet.

Embodiments of these methods may include one or more of the following features. The reflective sheet is sealed between the shaped object and the cover sheet, for example, by applying heat and pressure between the shaped object and the cover sheet. The pattern is defined by areas that are transparent to the optical radiation passing through the cover sheet and by other areas that are opaque to the optical radiation. The pattern can also be defined by a separate patterned sheet placed between the cover sheet and the reflective sheet. The light-reflecting object can be a molded helmet that is preferably made of polyurethane.

Additional features and advantages of the present invention will be apparent from the following description of preferred embodiments and from the claims.

DESCRIPTION OF THE PREFERRED EMBODIMENTS

Figure 1:
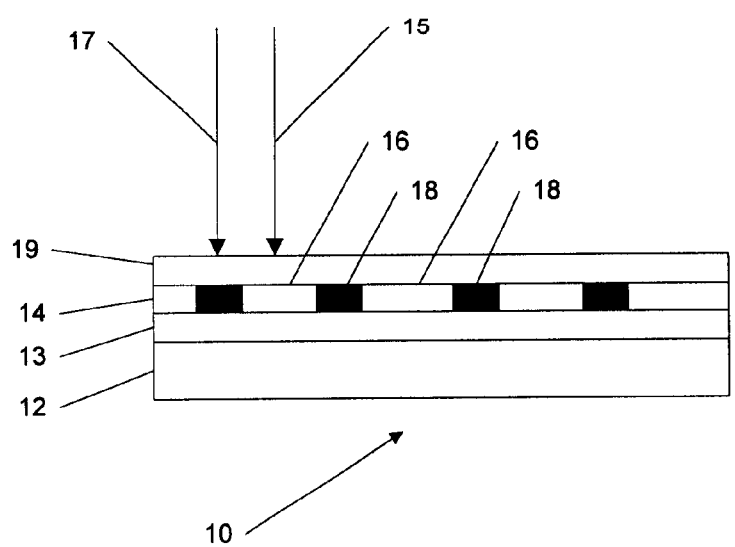
FIG. 1 shows an embodiment of the reflective object according to the invention.

In the drawings, identical elements or elements performing identical functions are indicated with identical reference numerals.

Referring to FIG. 1, a reflective object 10 includes a base 12 that is made of a material impervious to moisture, such as metal or plastic and preferably polyurethane. The base 12 can be rigid or flexible. Overlaying the base 12 are, in succession, a reflective sheet 13, a patterned sheet 14 and a transparent cover sheet 19. The cover sheet 19 is preferably made of a plastic material that is essentially impervious to air and moisture. The reflective sheet 13 includes a plastic sheet coated with a highly reflective metal, such as aluminum, silver or gold, or other suitable material with a high index of refraction. The patterned sheet 14 need not be a separate sheet, but can be printed on or embossed onto the transparent cover sheet 19. The patterned sheet 14 includes areas 18 that are opaque to light passing through the transparent cover sheet 19, and areas 16 that are transparent to the light. The transparent areas 16 and opaque areas 18, in aggregate, form a desired pattern or design. The opaque areas and the transparent areas can be colored, i.e., the areas can reflect and/or transmit selected spectral ranges of the light striking the surface of the object.

When light 15, 17 passes through the transparent cover sheet 19, the opaque areas 18 of patterned sheet 14 prevent a portion of the light 17 from reaching the reflective sheet 13, so that little, if any, light is reflected. On the other hand, light 15 that passes through the transparent areas 16 of the patterned sheet 14 and reaches the reflective sheet 13, is reflected by the reflective sheet 13. As a result, from the perspective of a viewer facing the transparent cover sheet 19, the opaque areas 18 appear dark, whereas the transparent areas 16 reflect the light and appear bright. In other words, the viewer sees a pattern having a shape that is defined by the shape of the transparent areas 16.

Figure 2:
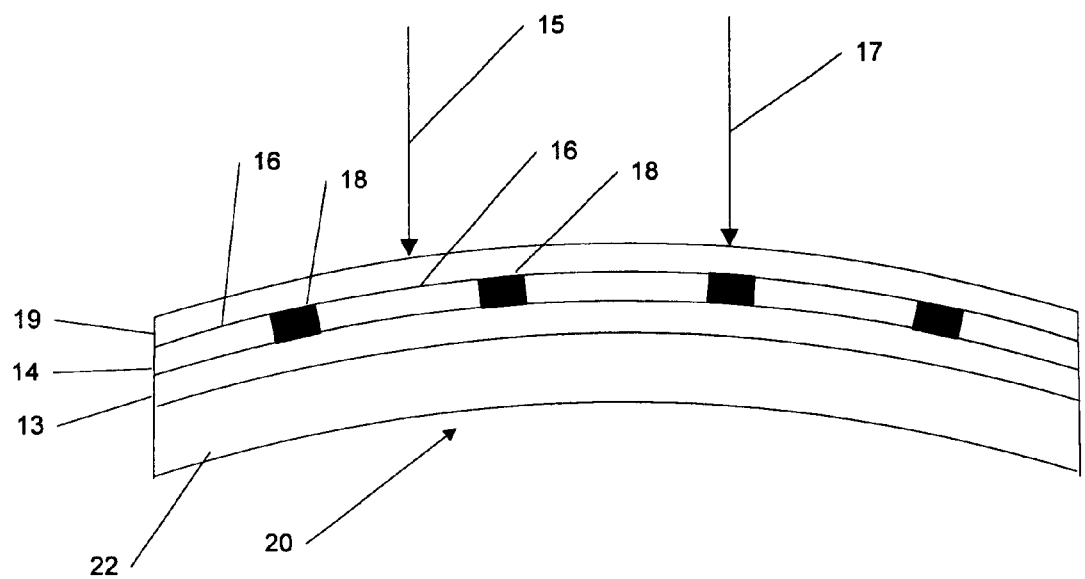
FIG. 2 shows another embodiment of the reflective object according to the invention.

Referring now to FIG. 2, in another embodiment of the invention, the reflective object is a shaped object, e.g., a molded object 22, such as a molded helmet, a sculptured sign and the like. The shaped object is preferably made from a material that is impervious to air and moisture.

Figure 3A:
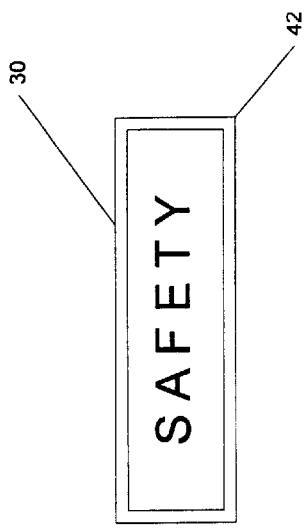
FIGS. 3A to 3C show examples of applications for the reflective objects.
Figure 3B:
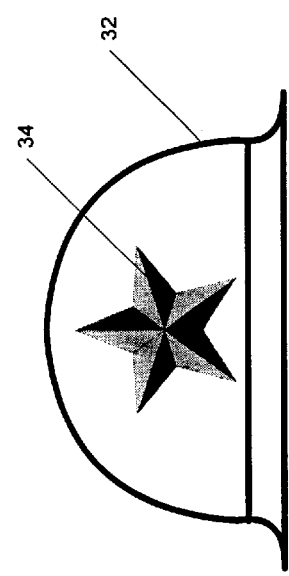
Figure 3C:
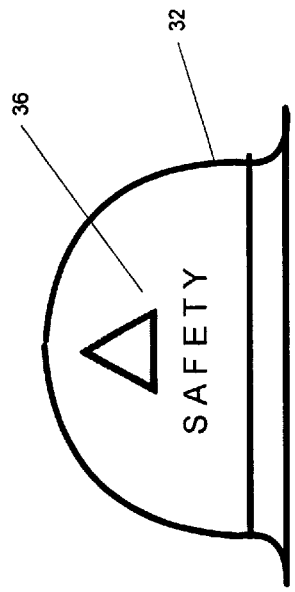

Referring to FIGS. 3A to 3C, illustrative examples of various reflective objects having base 10 or shaped base 31 of FIG. 1A and 1B are shown. FIG. 3A shows a warning sign 30 with reflective lettering and/or a reflective background. In this embodiment, the base 12, the reflective sheet 13, the patterned sheet 14, and the transparent cover sheet 19 are preferably sealed along the lateral edges 42, as also illustrated more particularly in FIG. 4. This design prevents air and moisture from the environment from reaching the reflective sheet 13.

Referring to FIGS. 3B and 3C, a reflective object is a protective helmet 32, for example a safety helmet (e.g., a bicycle or motorcycle helmet or a construction helmet) is shown. The reflective pattern applied to the helmet 32 can have the form of an ornamental design 34 (FIG. 3B) or a descriptive label and/or a logo 36 (FIG. 3C). The helmet 32 can be produced, for example, by an injection molding process, as described below.

Figure 4:
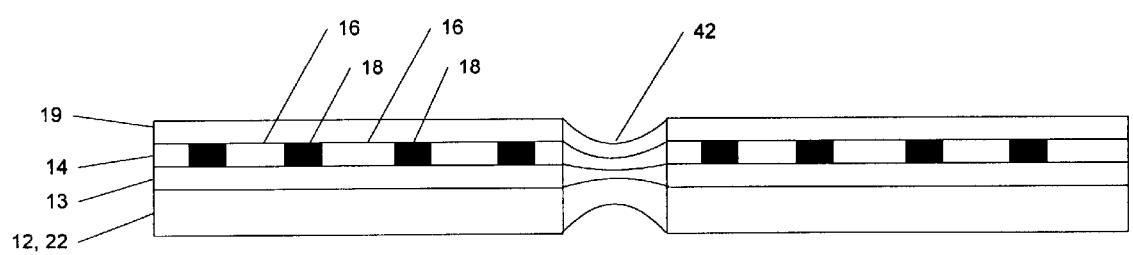
FIG. 4 shows another embodiment of the reflective object with a lateral seal.

As seen in FIG. 4, the reflective sheet 13 can advantageously be hermetically sealed against the environment with a seam 42. For example, a molding machine or a sealing press (not shown) can apply pressure and/or heat between the cover sheet and the base along predetermined seams 42 to encapsulate the reflective sheet between the base and the cover sheet. In this way, large sheets with several objects 32 can be manufactured on a base 12 in a single manufacturing process. The sheets are then cut along the seams 42 to separate the individual objects which are now sealed along their respective marginal edges. Alternatively, the base 12 and the shaped object 22, respectively, and the reflective sheet 13 can also be sealed between the cover sheet 19 and the base 12 or the shaped object 22 by applying heat and/or pressure over the surface area of the base or the shaped object and 19.

Figure 5:
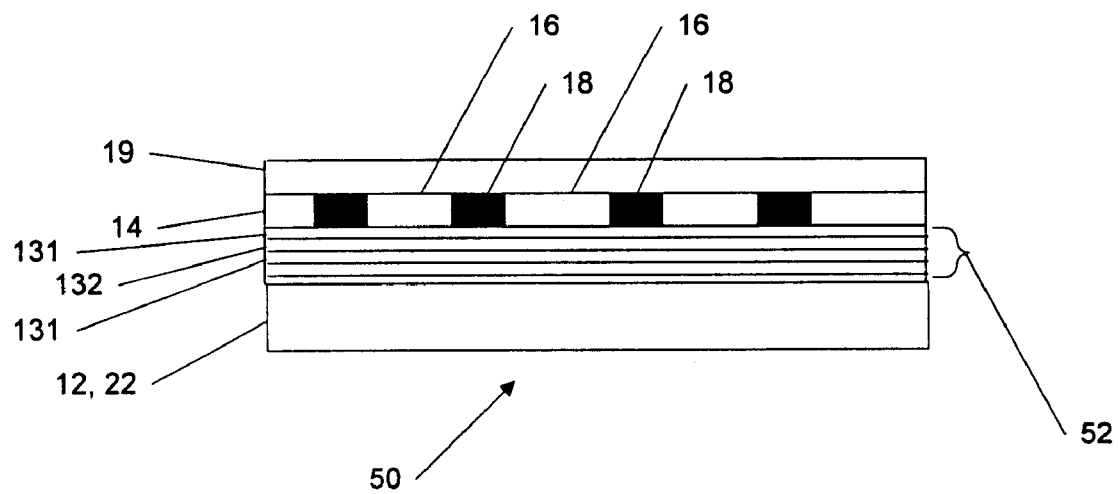
FIGS. 5 and 6 show other embodiments of the reflective object.

Referring now to FIG. 5, in another embodiment, a reflective object 50 includes a reflective sheet 52 in the form of a multilayer dielectric stack. In this case, the reflective sheet 52 is formed of a sequence of thin alternating dielectric layers 131, 132, wherein consecutive layers have a different index of refraction. When a dielectric stack 52 of this type is illuminated, the stack 52 selectively reflects one or more colors of the light. The color depends on the thickness and the index of refraction of the thin sheets and on their arrangement with respect to each other, as is known in the art. The specific color or colors can also depend on the direction from which the object is viewed. A dielectric stack 52 can have a significantly higher reflectivity than a single reflective sheet 13. The reflective sheet 52 can also include holograms (not shown).

Figure 6:
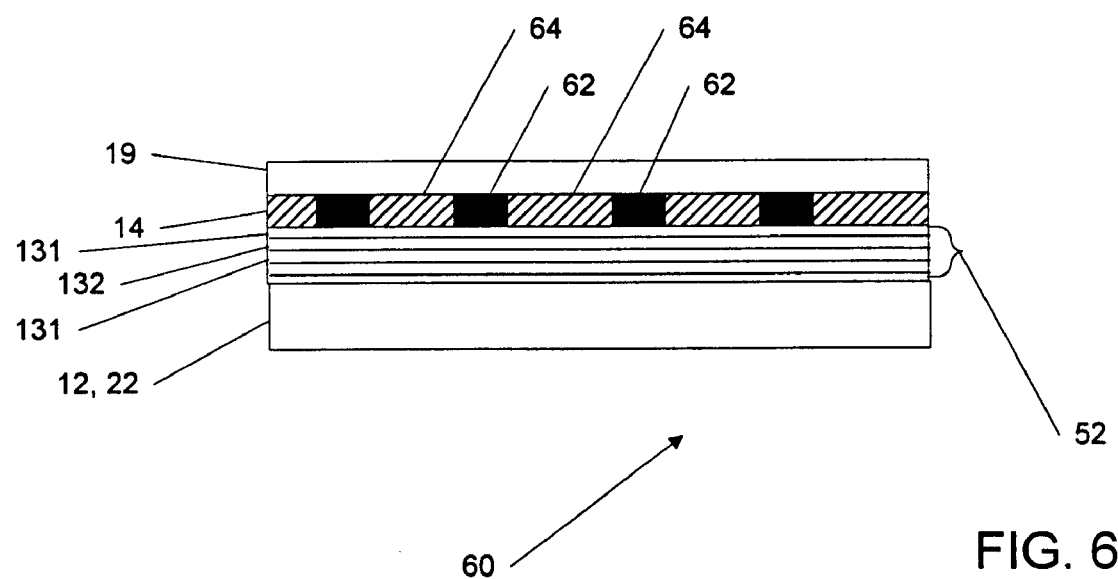

Referring now to FIG. 6, a reflective object 60 can be designed to reflect more than one color of the light striking the object. For example, when the thickness and refractive index of the thin layers 131, 132 are properly dimensioned, the dielectric stack 52 can be designed to reflect, for example, the red and blue spectral range of the light. Since the red and blue reflected colors add to form a green color, the transparent areas 64 appear green while the opaque areas 62 appear dark, as described above. However, the optical properties of the patterned sheet 14 and/or of the transparent cover sheet 19 can also be made color-selective, i.e., these sheets can function as optical filters. For example, the areas 62 of sheet 14 can be designed to absorb the red portion of the light and will therefore transmit only the blue portion of the red and blue light reflected by the dielectric stack 52. The areas 62 will therefore appear blue in reflection. Likewise, the areas 64 of sheet 14 can be designed to absorb the blue portion of the reflected light and will therefore transmit only the red portion of the light. The areas 64 will therefore appear blue in reflection. The cover sheet 19 can also have a spectrally selective light transmission. In other words, the reflective sheet 52, the patterned sheet 14 and cover sheet 19 can be designed to have different optical properties. Consequently, these sheets can be combined to produce a variety of different colors. The invention can therefore provide colorful reflective objects that can be produced in a simple manner.

Figure 7:
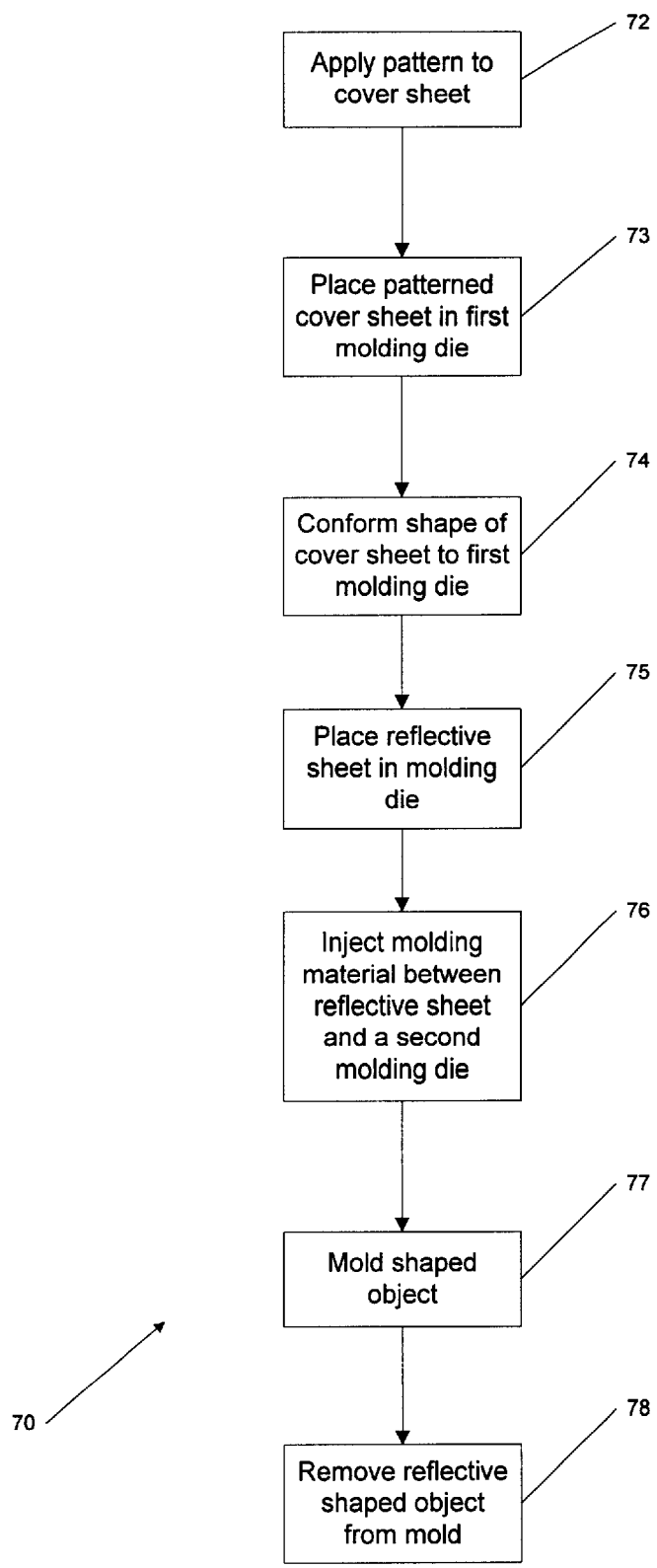
FIGS. 7 and 8 are flow diagrams of methods for producing the reflective object.

Referring now to FIG. 7, a process 70 for manufacturing a molded shaped object 20 (FIG. 2) with a reflective pattern is described. A printed pattern of desired shape and color is applied to a transparent cover sheet 19, step 72. Alternatively, as described above, instead of applying the pattern directly to the cover sheet 19, a patterned sheet 14 can be placed on the cover sheet 19. The transparent cover sheet 19 and the patterned sheet 14 are then placed in a first molding die (not shown), with the pattern or the patterned sheet 14 facing away from the molding die, step 73. The combination formed by the cover sheet 19 and the patterned sheet 14 is then molded to conform to the shape of the molding die, using high temperature and vacuum techniques, step 74. The reflective sheet 13, 52 is placed on top of the molded patterned sheet 14, step 75, and a plastic molding material, e.g., polyurethane, is injected between a second molding die (not shown) and the reflective sheet 13, step 76. The shaped object is formed by applying heat and pressure to the mold, step 77. The reflective shaped object 20, e.g., the helmet 32, which now includes the reflective pattern on its outer surface, is removed from the mold, step 78.

Figure 8:
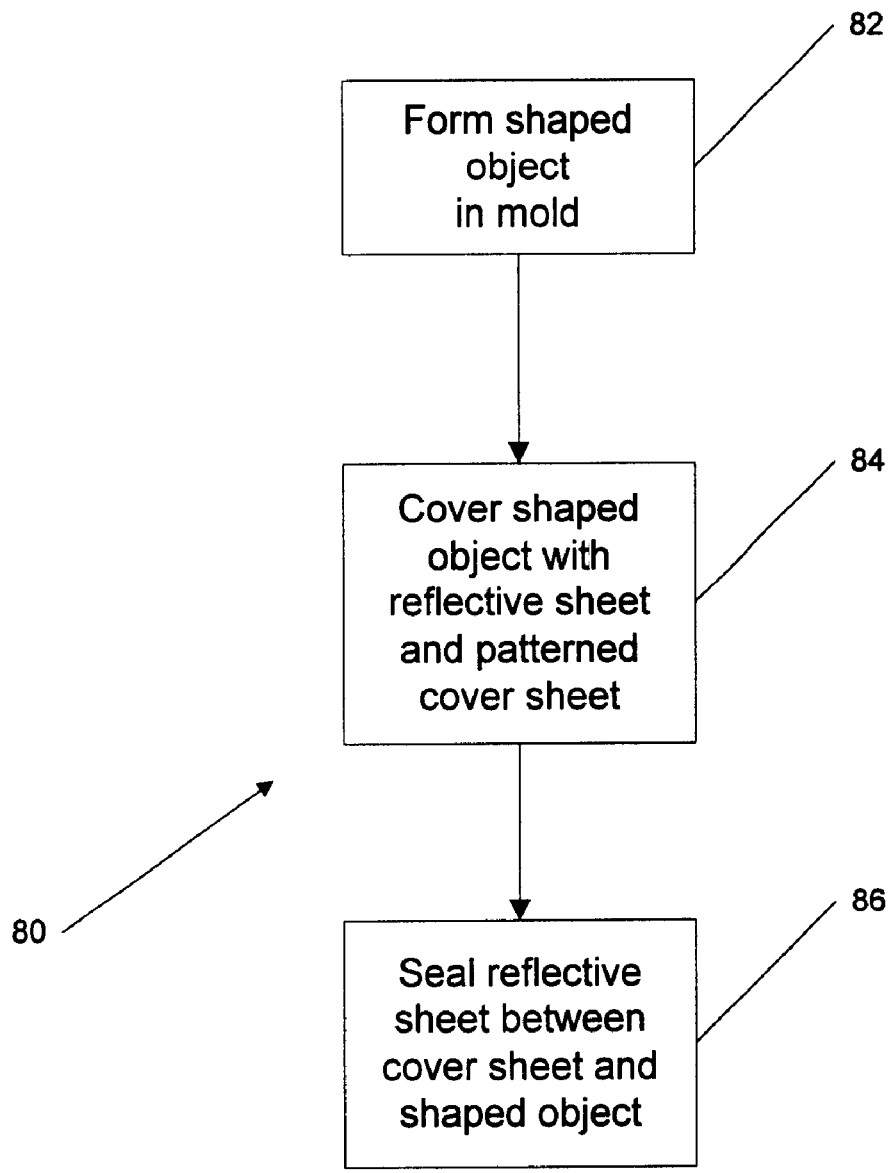

Referring now to FIG. 8, in an alternate process 80, a shaped object 22, 32 is initially formed in a molding machine (not shown), step 82. The shaped object 22, 32 is then covered with, in that order, the reflective sheet 13, 52 and the patterned cover sheet 19, step 84. As mentioned above, instead of forming a pattern on the cover sheet 19, a separate patterned sheet 14 can be inserted between the cover sheet 19 and the reflective sheet 13, 52. The reflective sheet 13 is then sealed between the cover sheet 19 and the shaped object 22, 32 to protect the reflective sheet 13 against the environment, step 86.

It is to be understood that the embodiments and variations shown and described above are illustrative of the principles of this invention only and that various modifications may be implemented by those skilled in the art without departing from the scope and spirit of the invention.

What is claimed is:

1. Protective headwear to be worn by a wearer, the article of headwear comprising:

a shell member having an internal volume sized and shaped to receive the head of a wearer, said shell member including:
a molded base;
a cover sheet including a pattern defined by areas that are transparent to optical radiation passing through the cover sheet and other areas that are opaque to the optical radiation, wherein the cover sheet is contiguous and substantially covers the base,
a contiguous reflective sheet arranged between the base and the cover sheet and sealed between the base and the cover sheet.

2. The protective headwear according to claim 1, wherein the cover sheet includes a patterned sheet defining the transparent and opaque areas, with the patterned sheet arranged between the cover sheet and the reflective sheet.

3. The protective headwear according to claim 1, wherein at least one of the base and the cover sheet is made of plastic.

4. The protective headwear according to claim 3, wherein the plastic is substantially impervious to at least one of air and moisture.

5. The protective headwear according to claim 1, wherein the reflective sheet comprises a metal.

6. The protective headwear according to claim 1, wherein the reflective sheet selectively reflects a spectral range of the optical radiation.

7. The protective headwear according to claim 1, wherein the cover sheet selectively transmits a spectral range of the optical radiation.

8. The protective headwear according to claim 1, wherein the molded base is made of polyurethane.

9. The protective headwear according to claim 1, wherein the reflective sheet is a dielectric stack.

10. The protective headwear according to claim 1, wherein at least one of the transparent areas and the opaque areas have spectrally selective optical characteristics.

11. The protective headwear according to claim 10, wherein the spectrally selective optical characteristics include light transmission at least two different colors.

12. The protective headwear according to claim 1, wherein the pattern defines an ornamental design.

13. The protective headwear according to claim 1, wherein the pattern defines a logo.

14. The protective headwear according to claim 1, wherein the pattern defines an alphanumeric pattern.

15. An article for reflecting optical radiation comprising:
a base formed as a shaped object;
a cover sheet including a pattern defined by areas that are transparent to the optical radiation passing through the cover sheet and other areas that are opaque to the optical radiation, wherein the cover sheet is contiguous and substantially covers the base,
a contiguous reflective sheet arranged between the base and the cover sheet and sealed between the base and the cover sheet wherein the shaped object is a protective head cover.

* * * * *